United States Patent
Baxter, Jr.

(10) Patent No.: US 6,578,657 B2
(45) Date of Patent: Jun. 17, 2003

(54) DRIVELINE ANGLE REDUCER

(75) Inventor: Ralph W. Baxter, Jr., Fort Wayne, IN (US)

(73) Assignee: Torque-Traction Technologies, Inc., Holland, OH (US)

( * ) Notice: Subject to any disclaimer, the term of this patent is extended or adjusted under 35 U.S.C. 154(b) by 0 days.

(21) Appl. No.: 09/879,218

(22) Filed: Jun. 13, 2001

(65) Prior Publication Data

US 2002/0189887 A1 Dec. 19, 2002

(51) Int. Cl.[7] .............................................. B60K 17/22
(52) U.S. Cl. ........................ 180/376; 180/381; 180/383; 464/140; 464/147; 464/178
(58) Field of Search ................................. 180/376, 379, 180/380, 381, 383; 464/140, 147, 153, 155, 170, 178

(56) References Cited

U.S. PATENT DOCUMENTS

| | | | |
|---|---|---|---|
| 1,149,166 A | | 8/1915 | Chase et al. |
| 2,027,329 A | | 1/1936 | Van Ranst |
| 2,198,352 A | * | 4/1940 | Tjaarda ....................... 180/376 |
| 2,198,353 A | * | 4/1940 | Tjaarda ....................... 180/376 |
| 2,381,399 A | | 8/1945 | Brown |
| 4,289,213 A | * | 9/1981 | Seaman ....................... 180/248 |
| 4,767,381 A | | 8/1988 | Brown et al. |
| 4,771,842 A | | 9/1988 | Mishio et al. |
| 4,778,026 A | * | 10/1988 | Uchida et al. .............. 180/381 |
| 5,116,293 A | | 5/1992 | Reuter |
| 5,358,066 A | | 10/1994 | Shope |
| 5,609,540 A | | 3/1997 | Brissenden et al. |
| 5,704,868 A | | 1/1998 | Lindsey et al. |
| 5,725,453 A | | 3/1998 | Zalewski et al. |

FOREIGN PATENT DOCUMENTS

| | | | | |
|---|---|---|---|---|
| GB | 2 087 327 | * | 5/1982 | ................. 180/380 |

* cited by examiner

*Primary Examiner*—Peter C. English
(74) *Attorney, Agent, or Firm*—Liniak, Berenato & White

(57) ABSTRACT

A driveline system for a motor vehicle includes at least two propeller shafts and a driveline angle reducer disposed therebetween for drivingly interconnecting the propeller shafts at a fixed operating angle. The driveline angle reducer includes a housing rotatably supporting therewithin a fixed-angle constant-velocity joint. The housing of the driveline angle reducer is mounted to a vehicle body and contains a supply of a lubricant for lubrication of the constant-velocity joint. The driveline angle reducer allows propeller shaft operating angles to be in a range where conventional Cardan joints can be used in the driveline systems without causing excessive cyclic vibrations.

15 Claims, 3 Drawing Sheets

DRIVELINE ANGLE REDUCER

BACKGROUND OF THE INVENTION

1. Field of the Invention

The present invention relates to driveline systems in motor vehicles, and more particularly to a driveline system having a fixed-angle constant-velocity joint.

2. Description of the Prior Art

In a driveline system for a vehicle such as an automobile, it has long been conventional to employ a single part propeller shaft coupled at its front end by a first universal joint, typically Cardan joint, to a power output shaft of a transmission and at its rear end by a second universal joint to a power input shaft of a differential assembly of the vehicle. Further, it is known to utilize a two part propeller shaft assembly made up from two propeller shaft elements coupled together by a second universal joint, and, as before, coupled at its front end by a first universal joint to the power output shaft of the transmission and at its rear end by a third universal joint to the power input shaft of the differential assembly of the vehicle; this type of two part propeller shaft assembly was introduced in order to reduce the vibration and consequent noise level during high speed operation.

It is known to those skilled in the art that even though universal joints may function at operating angles up to approximately 45°, they produce cyclic vibrations when operated at joint angles of more than a few degrees (approximately 2°–3°). Ordinary Cardan type universal joints cause a change in speed between driving and driven shafts whenever the joint operates at an angle. As the operating angle of the joint increases, the speed (velocity) of the driven shaft varies more and more during each revolution of the shafts. The greater the operating angle, the greater the variation in speed of the driven shaft and the greater the vibration it produces.

However, packaging restraints in present-day vehicles are such that operating angles between the power output shaft of the transmission and the propeller shaft are too large to be feasible in the production of vehicles utilizing conventional universal joints.

Thus, there is a need for a driveline angle reducer that would allow propeller shaft operating angles to be in a range where Cardan joints can be used in the driveline systems without causing excessive cyclic vibrations.

SUMMARY OF THE INVENTION

The present invention provides a driveline angle reducer for a driveline system of an automotive vehicle.

The driveline system of the present invention includes at least two propeller shafts and the driveline angle reducer disposed therebetween for drivingly interconnecting the propeller shafts at a fixed operating angle. The driveline angle reducer in accordance with the present invention includes a housing rotatably supporting a fixed-angle constant-velocity joint. The housing of the driveline angle reducer is mounted to a vehicle body and contains a supply of a lubricant for lubrication of the constant-velocity joint.

The novel fixed-angle driveline angle reducer in accordance with the present invention provides the considerably improved driveline system for the motor vehicle that solves vehicle packaging restraints by substantially increasing an angle between the adjacent propeller shafts, while allowing propeller shaft operating angles to be in a range where conventional Cardan joints can be used in the driveline systems without causing excessive cyclic vibrations.

BRIEF DESCRIPTION OF THE DRAWINGS

Other objects and advantages of the invention will become apparent from a study of the following specification when viewed in light of the accompanying drawings, wherein.

DETAILED DESCRIPTION OF PREFERRED EMBODIMENTS

The preferred embodiment of the present invention will now be described with the reference to accompanying drawing.

Figure 1:
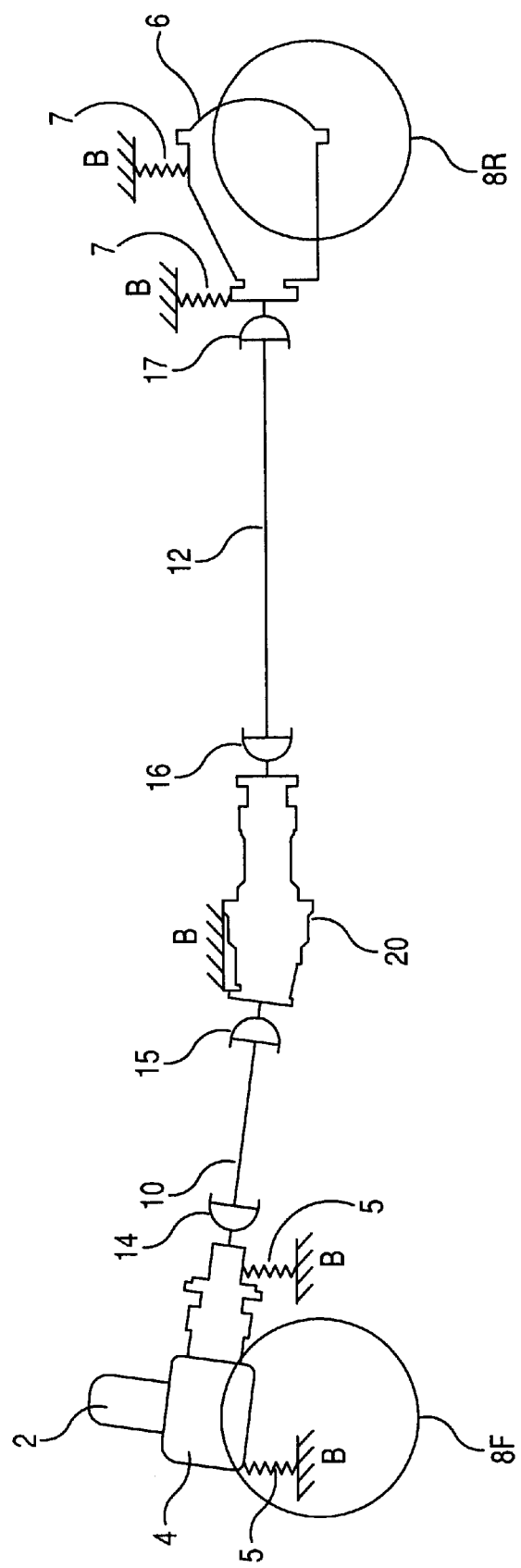
FIG. 1 is a schematic side view showing the preferred embodiment of a driveline system of the present invention as fitted to a power train of an automotive vehicle.

Referring now to FIG. 1 of the drawings, an exemplary embodiment of a driveline system in accordance with the present invention is schematically illustrated, for use in a conventional two-wheel drive or four-wheel drive automotive vehicle. In this figure, the reference numeral 2 denotes an internal combustion engine, 4 denotes a gear transmission mechanism, and 6 denotes a rear axle final drive and differential assembly. The motor vehicle is supported on a road surface by a set of front wheels 8F and rear wheels 8R. The engine 2 and the transmission mechanism 4 are elastically mounted to a body (or frame) B of the vehicle by elastic mounts 5. The final drive and differential assembly 6 is elastically mounted to the body (or frame) B of the vehicle by elastic mounts or springs 7 (such as coil or leaf springs).

An engine torque is transmitted from the transmission mechanism 4 to the final drive and differential assembly 6 through a driveline including a first propeller shaft 10, a second propeller shaft 12, and a driveline angle reducer 20 disposed therebetween for drivingly connecting the first propeller shaft 10 to the second propeller shaft 12 at a fixed (constant) operating angle.

Figure 2:
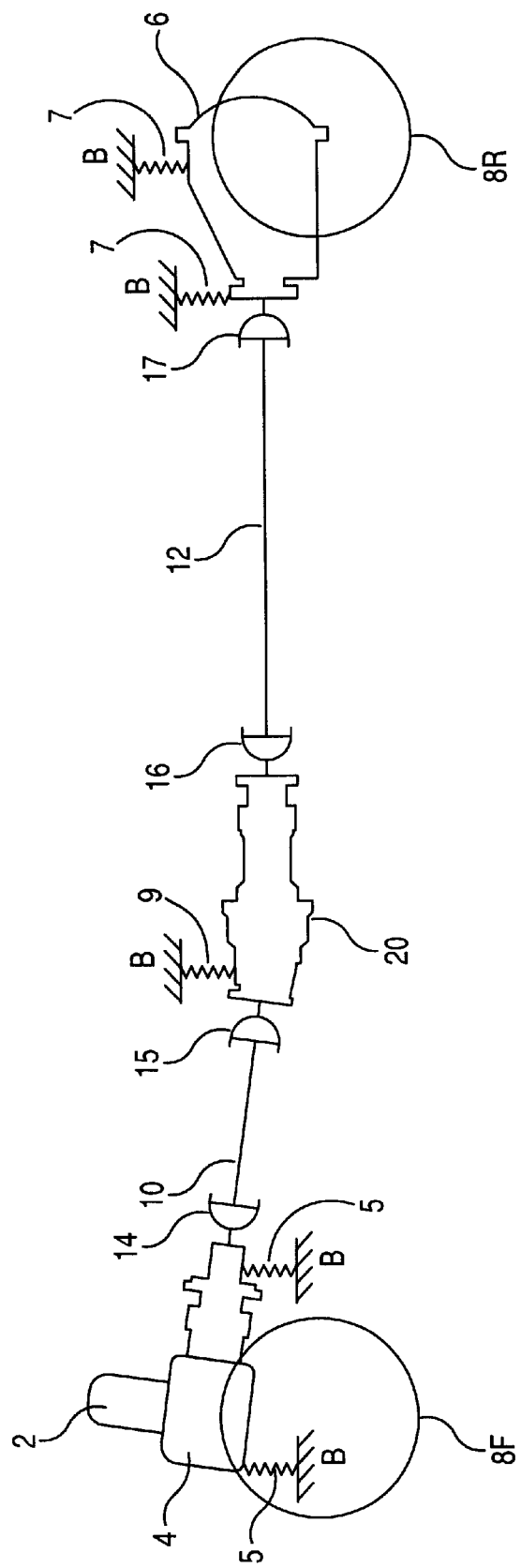
FIG. 2 is a schematic side view showing the alternative embodiment of the driveline system of the present invention as fitted to the power train of the automotive vehicle.

The driveline angle reducer 20 is fixedly mounted to the vehicle body (or frame) B by any appropriate means well known in the art, such as threaded bolts or brackets. Alternatively, the driveline angle reducer 20 is elastically mounted to the vehicle body (or frame) B by any appropriate elastic mounts 9, as illustrated in FIG. 2. The driveline angle reducer 20 also acts as a center bearing for the driveline system. The driveline angle reducer 20 of the present invention will be described in detail below.

The transmission mechanism 4 is coupled to the first propeller shaft 10 at one end thereof through a first universal joint, such as Cardan joint 14. The other end of the first propeller shaft 10 is coupled to the driveline angle reducer 20 through a second universal joint, such as Cardan joint 15.

Similarly, one end of the second propeller shaft 12 is coupled to the driveline angle reducer 20 through a third universal joint, such as Cardan joint 16, and the other end of the second propeller shaft 12 is coupled to the final drive and differential assembly 6 through a fourth universal joint, such as Cardan joint 17.

Figure 3:
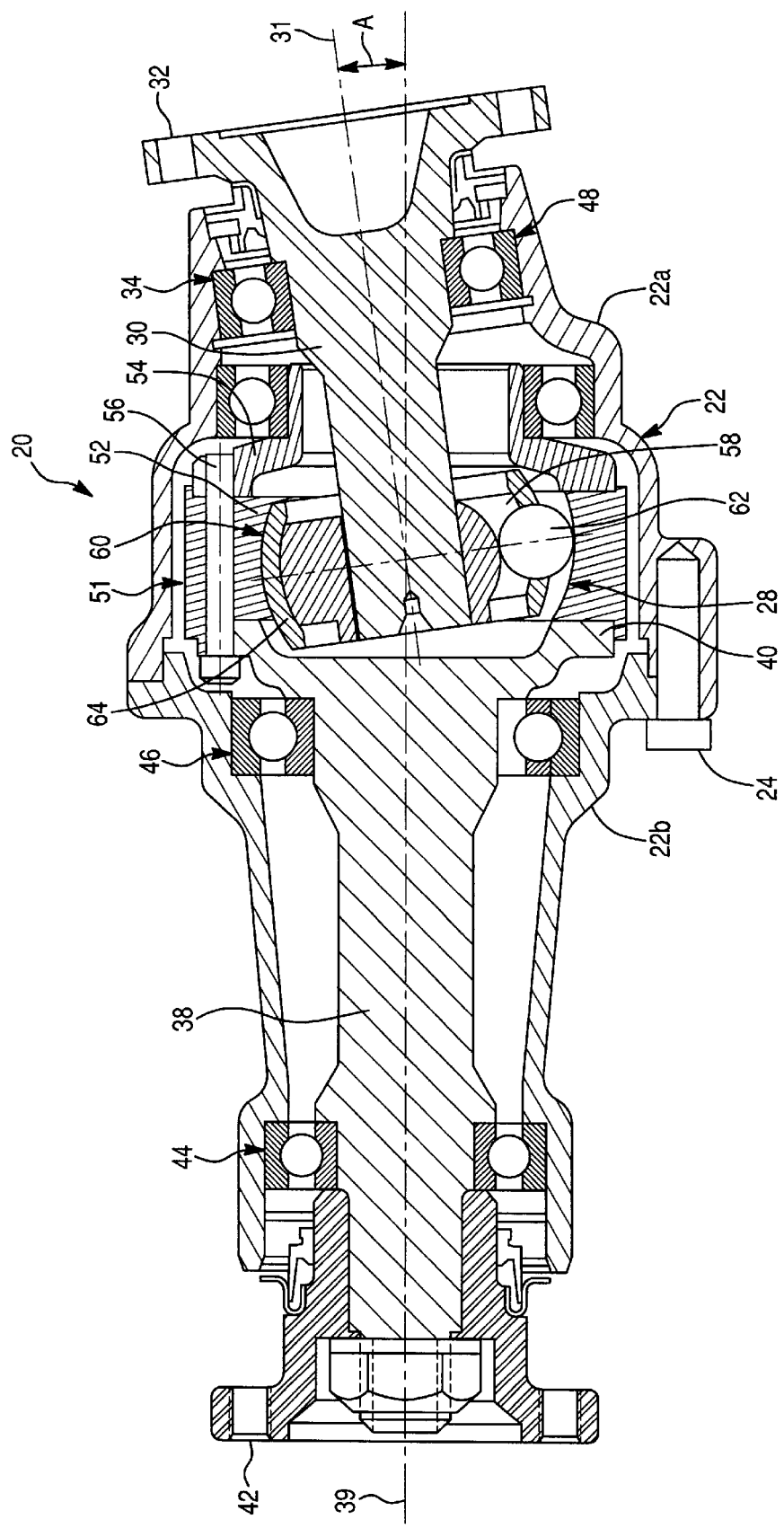
FIG. 3 is a longitudinal cross-sectional view of a driveline angle reducer in accordance with the preferred embodiment of the present invention.

Referring now to FIG. 3 of the drawings, the driveline angle reducer, generally designated by the reference numeral 20, is illustrated. The driveline angle reducer 20 comprises a housing 22 rotatably supporting therewithin a first shaft member 30 having a longitudinal axis of rotation 31 and a second shaft member 38 having a longitudinal axis of rotation 39, coupled by a fixed-angle universal joint. In accordance with the preferred embodiment of the present invention, a fixed-angle constant velocity universal joint (CV joint) 28 is employed. Thus, the driveline angle reducer 20 transfers the power torque from the first shaft 10 to the second shaft 12 at a fixed (constant) operating angle A. The operating angle is an angle between the axis of rotation 31 and the axis of rotation 39.

As illustrated in FIG. 1, the housing 22 is fixedly mounted to the vehicle body (or frame) B by any appropriate means well known in the art, such as threaded bolts or brackets. Alternatively, the driveline angle reducer 20 may be elastically mounted to the vehicle body (or frame) B by any appropriate elastic mounts 9 (as shown in FIG. 2). The housing 22 is made of two halves 22a and 22b fastened to each other, preferably by means of bolts 24. The first shaft member 30 is rotatably supported inside the housing 22 by an antifriction bearing 34 for rotation about the longitudinal axis of rotation 31. The second shaft member 38 is rotatably supported inside the housing 22 by antifriction bearings 44 and 46 for rotation about the longitudinal axis of rotation 39. An outboard end of the first shaft member 30 is integrally formed with a flange 32 adapted to be fastened to the Cardan joint 15. The second shaft member 38 includes a coupling flange 40 integrally formed at an inboard end thereof, and a coupling flange member 42 drivingly secured to an outboard end thereof and adapted to be fastened to the Cardan joint 16.

The CV joint 28 is a conventional CV joint well known to those skilled in the art. Preferably, the CV joint 28 is Rzeppa-type CV joint. Alternatively, other types of the CV joint may be used, such as "tripod" type joints.

As illustrated in FIG. 3, the fixed-angle CV joint 28 includes a hollow outer joint member 51 including an outer race member 52 positively secured between the coupling flange 40 of the second shaft member 38, and a bearing cap 54 by a set of bolts 56, thus defining the outer joint member 51 and forming a cavity 58. The bearing cap 54 is supported within the housing 22 by an antifriction bearing 48. An interior surface of the outer race member 52 is formed with a plurality of grooves. Located in the cavity 58 is an inner race member 60, defining an inner joint member, having a spherically shaped outer surface guided by the interior surface of the outer race member 52. A number of grooves corresponding to the number of grooves formed in the outer race member 52, are formed in an exterior surface of the inner race member 60. Accordingly, the grooves are spaced angularly about the axis 39 and 31 of the joint members 51 and 60 respectively, so that a plurality of pairs of grooves are provided with each pair consisting of one groove in the outer joint member 51 and one groove in the inner joint member 60.

Positioned in each pair of the grooves is a torque-transmitting ball 62. The balls 62 are guided and retained in a cage 64 made of sheet metal. During any angular deflection of the CV joint 28, the balls 62 are maintained in a plane bisecting the angle included by the axis 39 and 31 of the outer and inner joint members 51 and 60, and the balls 62 are held in this plane by the special disposition of the grooves and the cage 64. The cage 64 is a one-piece member and an outer circumference of the cage 64 is positioned on two diametrically opposite sides of the cavity 58 in the outer joint member 51.

Furthermore, it is well known to those skilled in the art that the CV joints require a lubrication by a special type of high temperature, high pressure lubricant. For this purpose, the housing 22 of the driveline angle reducer 20 contains a supply of an appropriate lubricant for lubrication of the CV joint 28.

Therefore, the novel driveline system of the present invention including the fixed-angle driveline angle reducer mounted to the vehicle body, solves vehicle packaging restraints by substantially increasing an angle between the adjacent propeller shafts, while allowing propeller shaft operating angles to be in a range where conventional Cardan joints can be used in the driveline systems without causing excessive cyclic vibrations.

The foregoing description of the preferred embodiments of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. In an automotive vehicle having a body that supports a source of rotational power, a final drive and a driveline system for transmitting the rotational power from the source to the final drive, said driveline system comprising:
   at least two propeller shafts; and
   at least one driveline angle reducer including a fixed-angle universal joint connecting a pair of said at least two propeller shafts, said driveline angle reducer is connected to at least one of said pair of propeller shafts through a universal joint.

2. The driveline system in said automotive vehicle, as defined in claim 1, wherein said fixed-angle universal joint is a constant-velocity joint.

3. The driveline system in said automotive vehicle as defined in claim 2, wherein said driveline angle reducer includes a housing enclosing said constant-velocity joint, said housing is mounted to said body of said vehicle.

4. The driveline system in said automotive vehicle as defined in claim 3, wherein said housing contains a supply of lubricant for lubricating said constant-velocity joint.

5. The driveline system in said automotive vehicle as defined in claim 3, wherein said housing is elastically mounted to said body of said vehicle.

6. The driveline system in said automotive vehicle as defined in claim 3, wherein said housing is rigidly mounted to said body of said vehicle.

7. The driveline system in said automotive vehicle, as defined in claim 1, wherein said driveline angle reducer includes a housing enclosing said fixed-angle universal joint, said housing is mounted to said body of said vehicle.

8. The driveline system in said automotive vehicle as defined in claim 7, wherein said housing is elastically mounted to said body of said vehicle.

9. The driveline system in said automotive vehicle as defined in claim 7, wherein said housing is rigidly mounted to said body of said vehicle.

10. The driveline system in said automotive vehicle as defined in claim 7, wherein said housing contains a supply of lubricant for lubricating said fixed-angle universal joint.

11. The driveline system in said automotive vehicle, as defined in claim 1, wherein said universal joints connecting said driveline angle reducer to said pair of propeller shafts are Cardan joints.

12. In an automotive vehicle having a body that supports a source of rotational power, a final drive and a driveline system for transmitting the rotational power from the source to the final drive, said driveline system comprising:

at least two propeller shafts; and a driveline angle reducer including:
  a fixed-angle constant-velocity joint connecting a pair of said at least two propeller shafts;
  a housing enclosing said fixed-angle constant-velocity joint and mounted to said body of said vehicle, said housing containing a supply of lubricant for lubricating said fixed-angle constant-velocity joint;
  a first shaft member coupled to an inner joint member of said fixed-angle constant-velocity joint; and
  a second shaft member coupled to an outer joint member of said fixed-angle constant-velocity joint;
  an outboard end of said first shaft member is coupled to one of said pair of propeller shafts through a universal joint;
  an outboard end of said second shaft member is coupled to the other of said pair of propeller shafts through a universal joint.

13. The driveline system in said automotive vehicle, as defined in claim 12, wherein said housing is elastically mounted to said body of said vehicle.

14. The driveline system in said automotive vehicle, as defined in claim 12, wherein said housing is rigidly mounted to said body of said vehicle.

15. The driveline system in said automotive vehicle, as defined in claim 12, wherein said universal joints are Cardan joints.

* * * * *